United States Patent [19]

Audeh

[11] Patent Number: 4,834,953

[45] Date of Patent: May 30, 1989

[54] PROCESS FOR REMOVING RESIDUAL MERCURY FROM TREATED NATURAL GAS

[75] Inventor: Costandi A. Audeh, Princeton, N.J.

[73] Assignee: Mobil Oil Corporation, New York, N.Y.

[21] Appl. No.: 102,954

[22] Filed: Sep. 30, 1987

[51] Int. Cl.⁴ ............... B01D 53/02; C01B 17/16
[52] U.S. Cl. ............... 423/210; 423/230; 423/563
[58] Field of Search ............ 423/210, 230, 561 B, 423/563; 55/72

[56] References Cited

U.S. PATENT DOCUMENTS

| | | | |
|---|---|---|---|
| 3,331,657 | 7/1967 | Peter et al. | 423/562 |
| 4,500,327 | 2/1986 | Nishino et al. | 55/72 |
| 4,556,547 | 12/1985 | Nishino et al. | 423/230 |
| 4,591,490 | 5/1986 | Horton | 423/210 |

FOREIGN PATENT DOCUMENTS

| | | | |
|---|---|---|---|
| 156345 | 9/1983 | Japan | 55/72 |
| 304966 | 7/1971 | U.S.S.R. | 423/210 |
| 833287 | 5/1981 | U.S.S.R. | 423/210 |

*Primary Examiner*—John Doll
*Assistant Examiner*—Jeffrey Edwin Russel
*Attorney, Agent, or Firm*—Alexander J. McKillop; Charles J. Speciale

[57] ABSTRACT

Gases such as nitrogen and natural gas are depleted of contaminating mercury by contacting the gas first with an aqueous solution of sodium polysulfide and subsequently contacting the effluent gas with a cobalt salt, for example, cobalt chloride. The effluent gas subsequently treated as desired to remove moisture and any other contaminants present.

12 Claims, No Drawings

PROCESS FOR REMOVING RESIDUAL MERCURY FROM TREATED NATURAL GAS

NATURE OF THE INVENTION

This invention relates to a method for purifying and removing trace amounts of mercury from natural gas.

PRIOR ART

Trace quantities of mercury are known to exist in natural gases but the significance of these trace quantities has not been recognized until recently. The mercury detected in the produced gas is now known not to result from well drilling or well completion operations and does not result by accident in the gas stream. The mercury is produced in association with the gas and is thought to originate from geologic deposits in which the natural gas occurs. Even in trace quantities however, mercury is an undesirable component of natural gas. The processing of natural gas in LNG plants requires contact of mercury-laden natural gas with some equipment made primarily of aluminum. This is particularly true after the steps of treating the gas to remove carbon dioxide and hydrogen sulfide when the gas is chilled or cooled in aluminum-constructed heat exchangers. Aluminum heat exchangers represent a capital investment of several million dollars. Damage to these exchangers is to be avoided if at all possible. Although the concentration of mercury as it amalgamates with the aluminum. The result can be damage to the system, particularly the heat exchangers, such as corrosion cracking leading to equipment failure, fires and similar catastrophe. Repair is correspondingly difficult because of damage to the welded seams of the aluminum. Replacement of the heat exchangers in an LNG plant represents a large expenditure. The problem of mercury in natural gas is discussed further in U.S. Pat. No. 4,094,777 and French Pat. No. 2,310,795, both of which are incorporated herein by reference.

Several methods have been proposed for absorbing mercury from natural gas. For example, J.E. Leeper in Hydrocarbon Processing, Volume 59, November, 1980, pages 237-240, describes a procedure wherein natural gas is contacted with a fixed bed of copper sulfide on an alumina-silica support to remove the mercury present. Another commercial process is based on contacting the mercury-contaminated gas with sulfur supported on activated carbon. According to the Leeper article, the sulfur impregnated activated charcoal process is regarded as the best system for treating a gas stream, particularly one free of heavy hydrocarbons. The reference, Hydrocarbon Processing, Volume 59, November, 1980, pages 237-240, is incorporated herein by reference.

A primary object of this invention is to provide an improved process for removing trace quantities of mercury present in a gas, particulary a natural gas.

SUMMARY OF THE INVENTION

Briefly stated, this invention comprises reducing the concentration of mercury in a gas by first contacting it with an aqueous solution of an alkali polysulfide such as sodium polysulfide ($Na_2S_x$) and subsequently contacting the gas with a cobalt salt supported on a suitable support. Therafter a gas substantially depleted of mercury and of hydrogen sulfide is recovered for subsequent processing.

DESCRIPTION OF THE INVENTION

As stated above, the initial step in treating the gas containing mercury is to contact it with an aqueous solution of a water soluble alkali polysulfide. Preferably the water soluble alkali polysulfide is sodium polysulfide and the concentration of sulfur in the polysulfide solution, is between a 5 and 20%. The gas to be treated is contacted with the aqueous polysulfide solution in several different ways. A preferred method is to introduce the gas into the bottom of a contact tower such as a bubble tower or packed tower and to inject the aqueous solution of polysulfide near the top of the tower in countercurrent flow so that the gas thoroughly contacts the aqueous polysulfide solution. The effluent gas is then transferred to a contact bed where the gas contacts a cobalt salt supported on a non-reactive carrier material such as alumina, calcium sulfate, or a silica. Any soluble cobalt salts can be used. These include chloride, bromide, sulfate, and nitrate sulfide forms. The concentration of cobalt salt on the non-reactive carrier preferably is between about 1.0 and 20.0 percent by weight.

The gas subsequently is withdrawn and treated to remove any moisture or other undesirable materials present in the gas. The temperature at which this process is carried out can be ambient, i.e., about 70° F. and the pressure can be at or near atmospheric pressure. Temperature and pressure conditions can also be at the existing process conditions of the existing process plant that utilizes the elements of this treating process, i.e. polysulfide washing and cobalt salt treating.

Gases to be treated according to this invention ordinarily will comprise methane although other gases such as nitrogen or other nonreactive gases contaminated with mercury may also be considered for this treatment.

EXAMPLES

Example 1

Nitrogen gas containing 0.03 ppb of mercury and 0.3% of carbon dioxide was treated by bubbling it through a solution of sodium polysulfide containing 4.4% by weight of sodium polysulfide. The effluent gas was determined to have a mercury content of less than 0.01 ppb.

Example 2

Nitrogen gas containing 0.03 ppb of mercury and 0.3% of carbon dioxide was flowed through a bed containing about 50 grams of calcium sulfate ($CaSO_4$) which has been impregnated with about 1.5 grams of cobalt sulfide. Nitrogen gas leaving the cobalt sulfide bed was determined to have a mercury content of 0.013 ppb. This test demonstrates that cobalt sulfide can remove mercury from a mercury-contaminated gas.

Example 3

Nitrogen gas containing 0.03 ppb of mercury and 0.3% of $CO_2$ was treated by contacting it first with an aqueous solution of sodium polysulfide containing 4.4 weight percent of polysulfide. The effluent gas was subsequently passed through a pack of about 10 grams of calcium sulfate impregnated with about 0.3 grams of cobalt chloride. The effuent gas was determined to have a mercury content of less than 0.01 ppb. It was noted that the gas upon contacting the calcium sulfate which was impregnate with cobalt chloride reacted and yielded a black colored salt (cobalt sulfide). The presence of hydrogen sulfide in the gas leaving the polysulfide treater was determined by noting the reaction of the gas with paper impregnated with lead acetate and by the distinct odor of rotten eggs.

The solium polysulfide solution is prepared from:

$Na_2S.9H_2O$ and elemental sulfur, by heating a solution of $Na_2S.9H_2O$ in water with the desired amount of sulfur to provide a solution containing $Na_2S_x$. Typically such aqueous solutions contain between 15 and 25% sulfur.

What is claimed is:

1. A process for treating a gas containing mercury comprising:
   (a) contacting said gas with an aqueous solution of an alkali polysulfde;
   (b) contacting the effluent gas with cobalt chloride; and
   (c) recovering from step (b) a gas containing a substantially reduced concentration of mercury,
   whereby said gas recovered in step (c) is also substantially depleted of hydrogen sulfide.

2. A process for treating a gas containing mercury comprising:
   (a) contacting said gas with an aqueous solution of sodium polysulfide containing between about 5 and about 20 percent sulfur;
   (b) contacting the resulting effluent gas with a cobalt chloride supported on a calcium sulfate support; and
   (c) recovering from step (b) a gas containing a substantially reduced concentration of mercury,
   whereby said gas recovered in step (c) is also substantially depleted of hydrogen sulfide.

3. A process for treating a gas containing mercury comprising:
   (a) contacting said gas with an aqueous solution of an alkali polysulfide to effect the removal of mercury, thereby forming $H_2S$ in situ;
   (b) contacting the effluent gas with a cobalt salt to remove the $H_2S$;
   (c) recovering from step (b) a gas containing a substantially reduced concentration of mercury,
   whereby said gas recovered in step (c) is also substantially depleted of $H_2S$.

4. The process of claim 1 wherein the gas to be treated is nitrogen.

5. The process of claim 1 wherein the gas to be treated is natural gas.

6. The process of claim 1 wherein the cobalt salt is any soluble cobalt salt.

7. The process of claim 1 wherein the cobalt salt is selected from the group consisting of chloride, bromide, sulfate, and nitrate.

8. The process of claim 1 wherein the alkali polysulfide is sodium polysulfide.

9. The process of claim 1 wherein the aqueous alkali polysulfide solution contains between about 5 and about 20 percent sulfur.

10. The process of claim 1 wherein the cobalt salt is supported on a non-reactive support selected from the group consisting of silica, alumina, calcium sulfate and mixtures thereof.

11. The process of claim 1 wherein the cobalt salt is present on the non-reactive support in a concentration of between about 1 and about 20 percent of the total weight of salt and support.

12. The process recited in claim 3, wherein step (b) comprises
contacting the effluent gas with a sorbant consisting of cobalt salt on a calcium sulfate support.

* * * * *